June 11, 1968  W. A. WHITMIRE ET AL  3,387,860
STEERING DEVICE FOR CONNECTED TRACTOR AND DOLLY VEHICLES
Filed Sept. 9, 1966  7 Sheets-Sheet 2
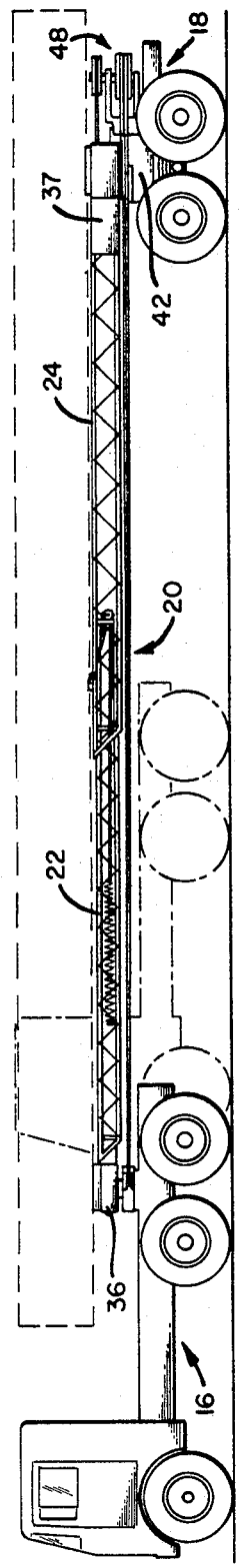
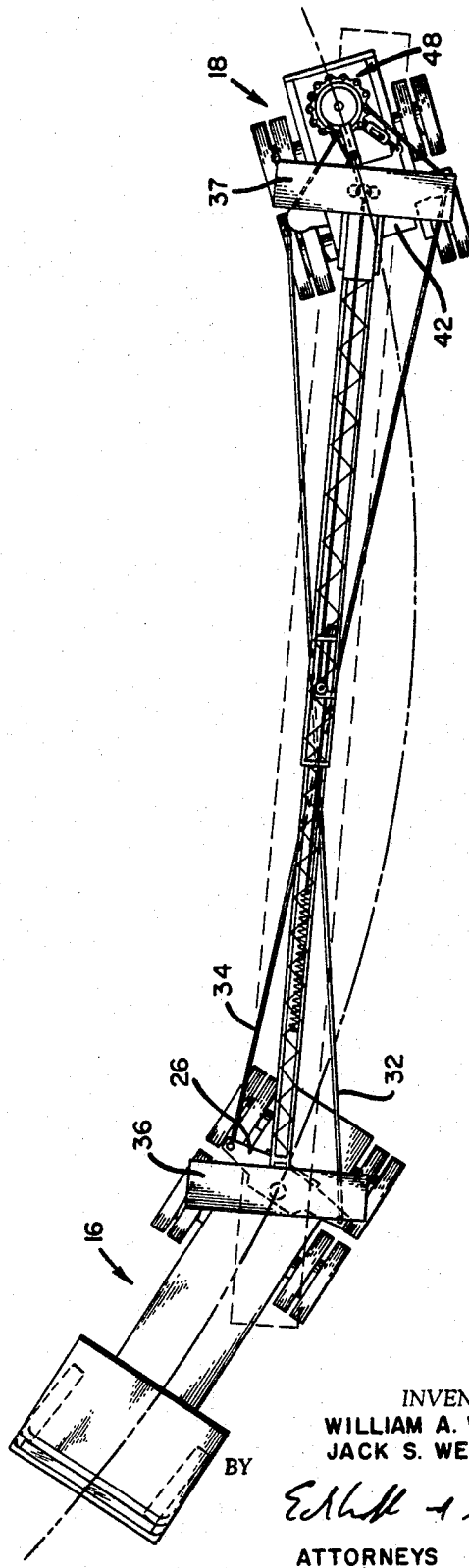
INVENTORS
WILLIAM A. WHITMIRE
JACK S. WEBBER
BY
ATTORNEYS

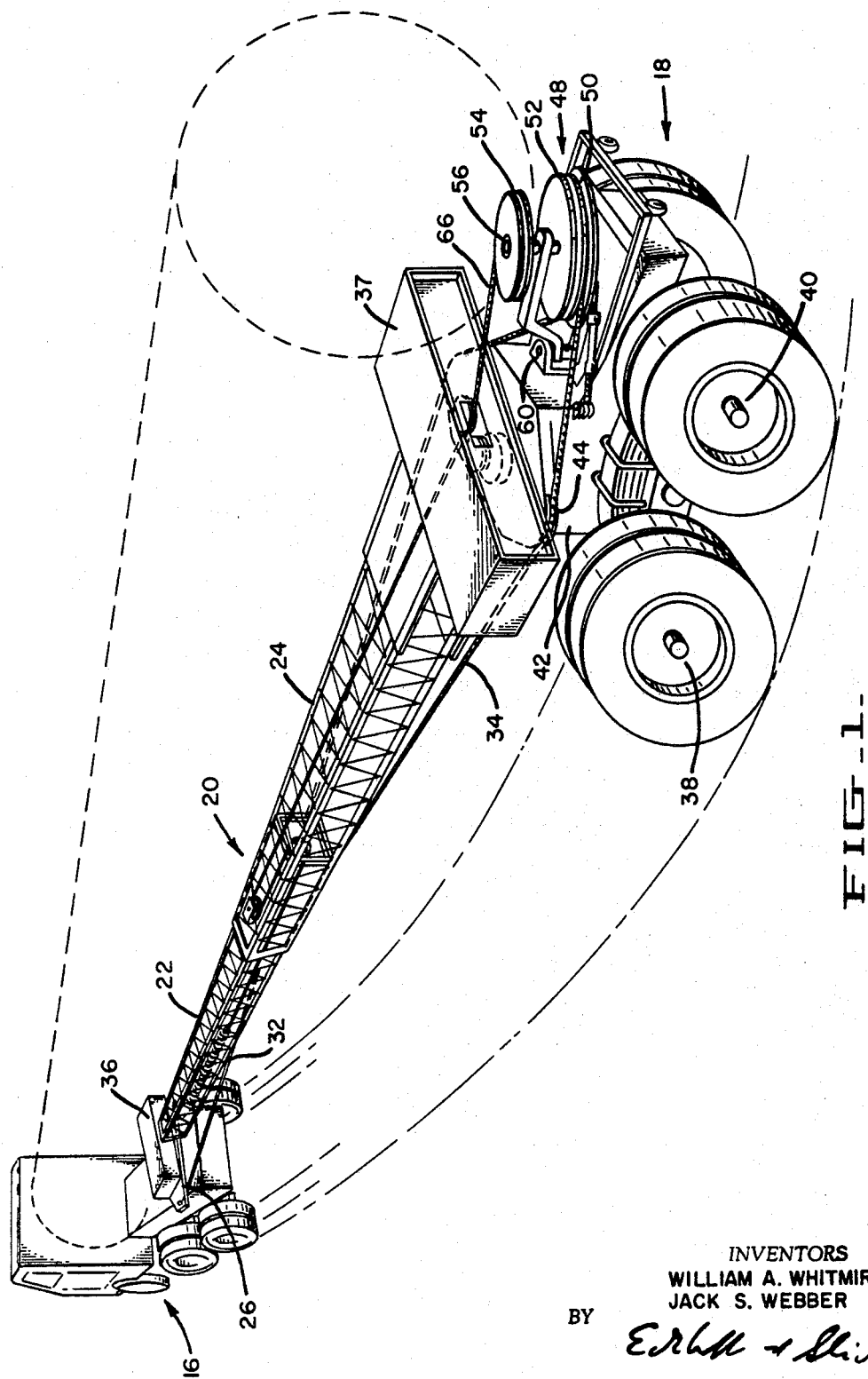

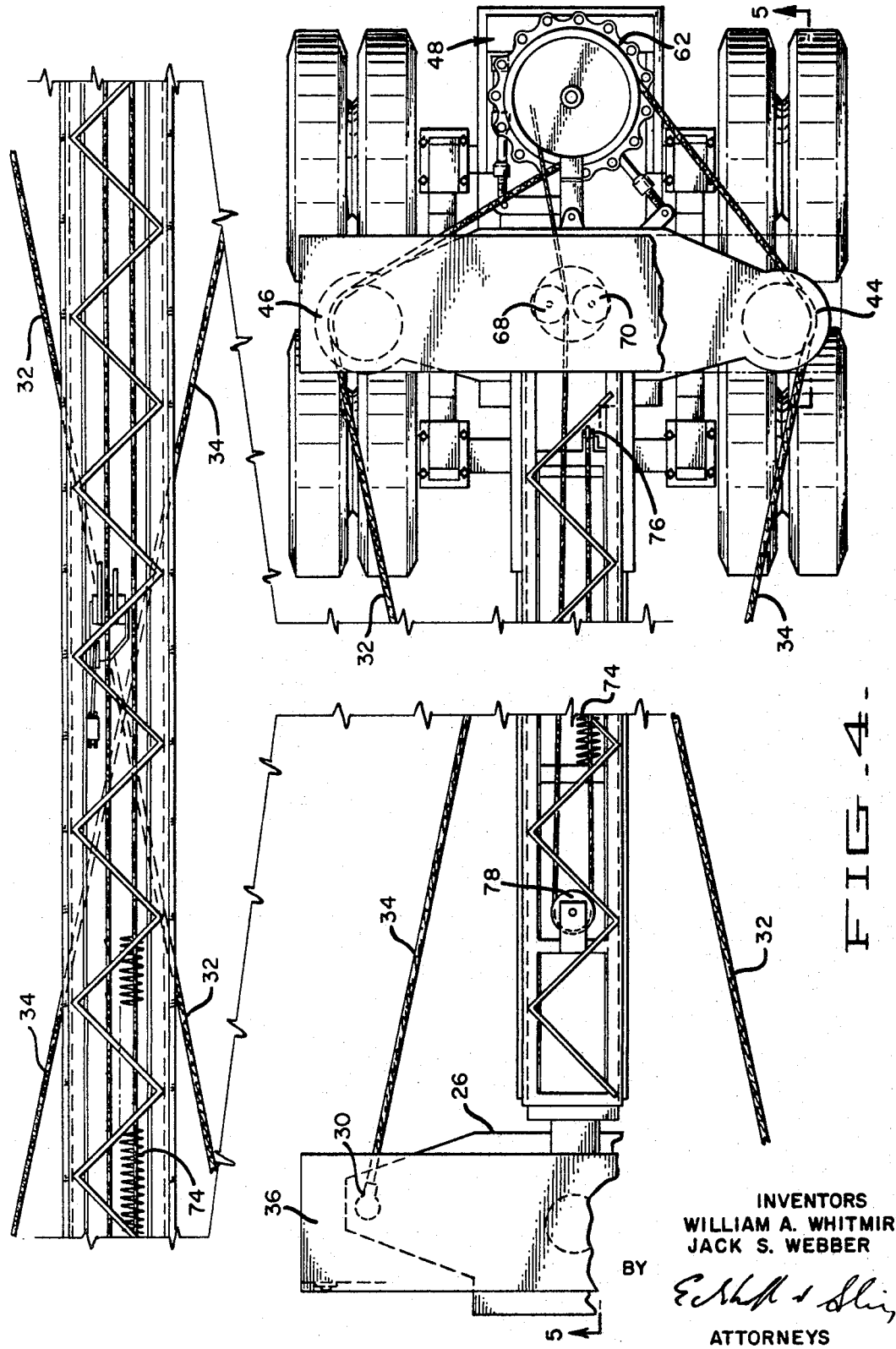

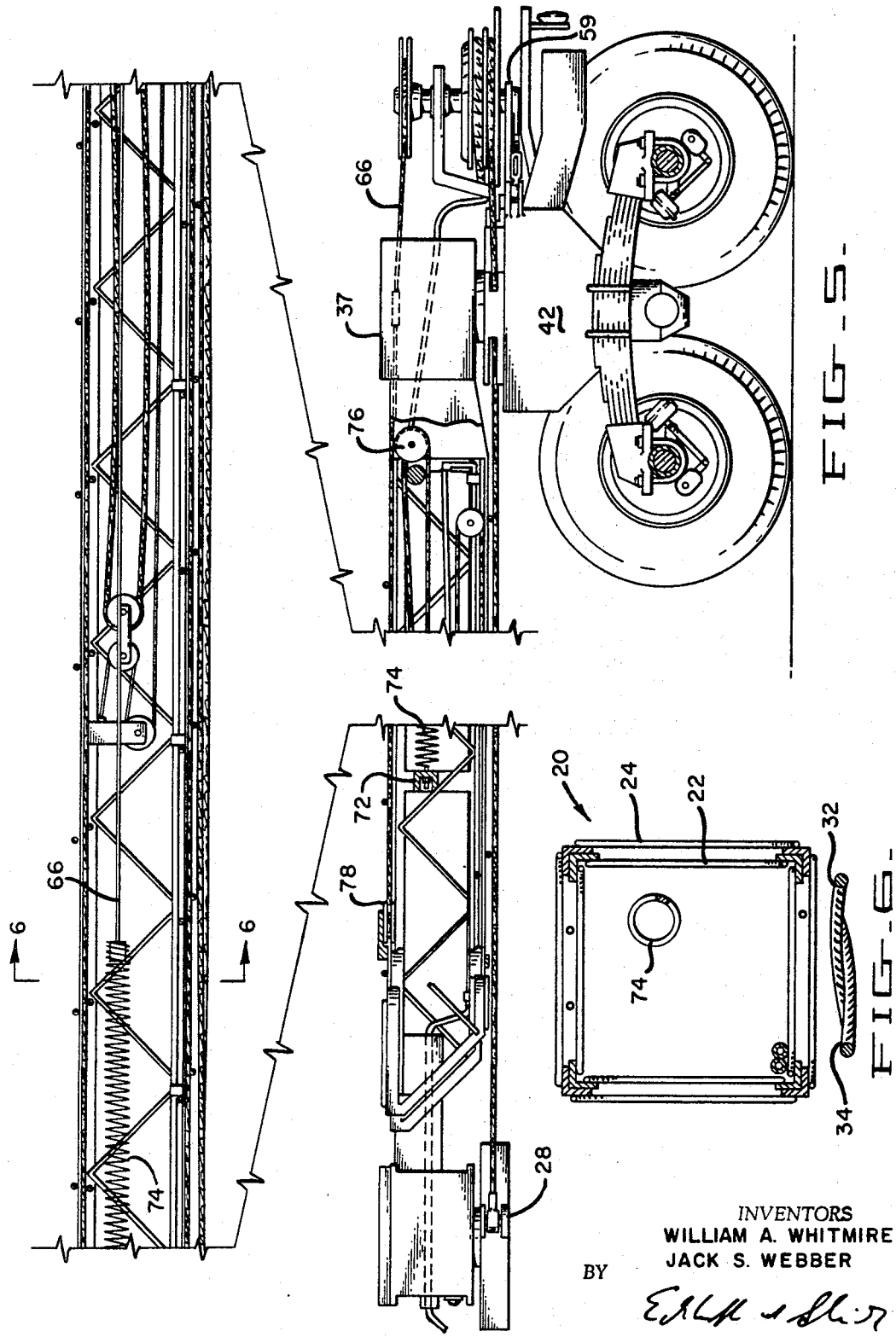

June 11, 1968 W. A. WHITMIRE ET AL 3,387,860
STEERING DEVICE FOR CONNECTED TRACTOR AND DOLLY VEHICLES
Filed Sept. 9, 1966 7 Sheets-Sheet 5
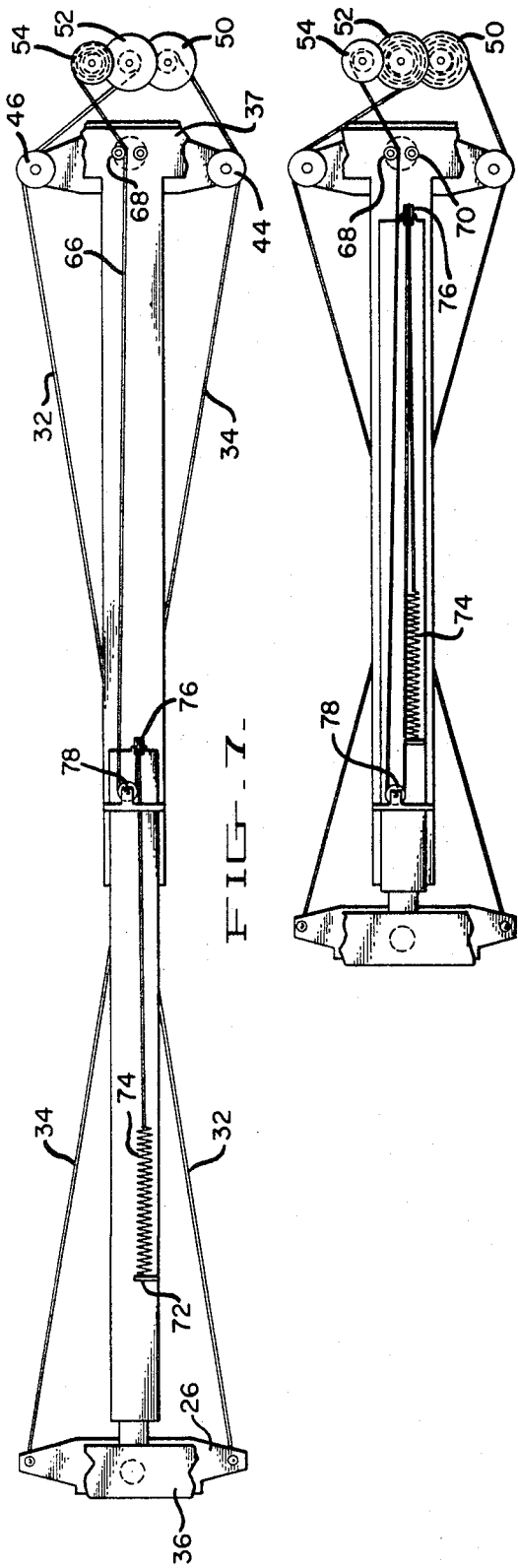
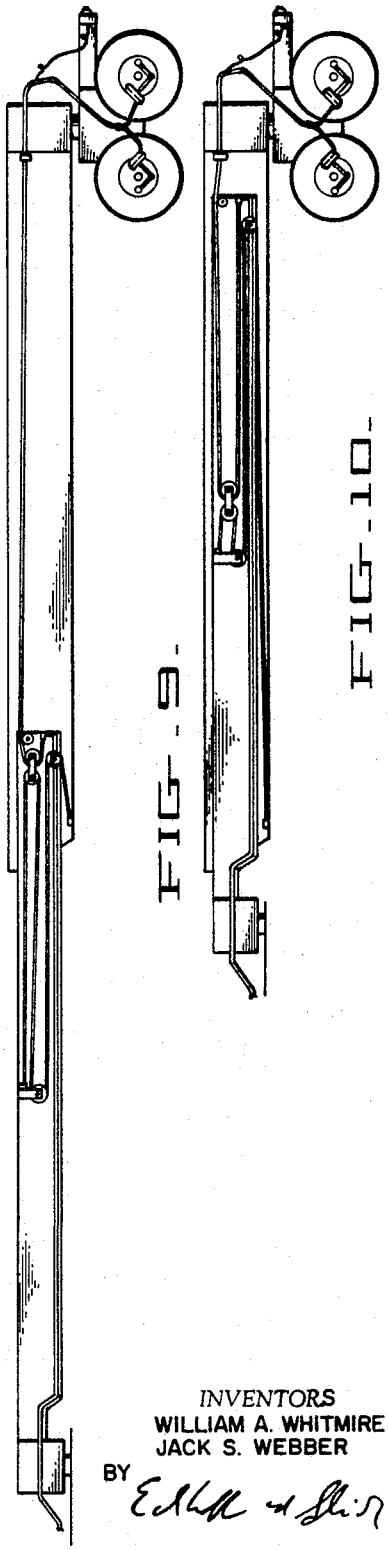
INVENTORS
WILLIAM A. WHITMIRE
JACK S. WEBBER
BY
ATTORNEYS June 11, 1968  W. A. WHITMIRE ET AL  3,387,860
STEERING DEVICE FOR CONNECTED TRACTOR AND DOLLY VEHICLES
Filed Sept. 9, 1966  7 Sheets-Sheet 7

*INVENTORS*
WILLIAM A. WHITMIRE
JACK S. WEBBER
BY

ATTORNEYS

United States Patent Office 3,387,860
Patented June 11, 1968

3,387,860
STEERING DEVICE FOR CONNECTED
TRACTOR AND DOLLY VEHICLES
William A. Whitmire, Castro Valley, and Jack S. Webber, Walnut Creek, Calif., assignors to Henry W. Bigge
Filed Sept. 9, 1966, Ser. No. 578,258
6 Claims. (Cl. 280—404)

This invention relates to an improved form of steering device for tractor and dolly vehicles, and more particularly relates to an improved form of steering device having crossed steering cables with means for automatically adjusting the lengths of the cables depending upon the length of the vehicle. The present invention constitutes an improvement on the structure shown in Patent No. 3,156,487.

Although the structure shown in Patent No. 3,156,487 is a highly satisfactory device, it is necessary when adjusting the length of the vehicle, i.e., when changing the length of the reach between the tractor vehicle and the dolly, to make a manual adjustment of the length of the steering cables. In accordance with the present invention, a device is provided wherein it is not necessary to manually adjust the length of the cables, but it is only necessary to draw the vehicle out or telescope it to the desired length and the steering cables will automatically adjust for the length selected.

Therefore, an important object of the present invention is to provide in an automatic steering system wherein crossed cables are used and wherein the reach connecting the tractor to the dolly vehicle can be adjusted to a desired length, a device whereby the steering cables will automatically be adjusted to their required lengths.

Still another object of this invention is to provide an automatic cable system having an adjusting feature to compensate for any inequality which might develop between the steering cables.

A still further object of this invention is to provide an automatic take-up and locking device for a cable steering system which is capable of locking the cables at any desired length.

Another object of this invention is to provide a vehicle having a telescoping reach wherein an automatic indicator light will advise the operator when the vehicle has been extended to a predetermined, desired length.

Other objects and features of the invention will be apparent from the balance of the specification which follows.

In the drawings forming part of this application:

FIGURE 1 is a perspective view of a vehicle embodying the present invention.

FIGURE 2 is a side view of the vehicle shown in FIGURE 1 with the vehicle shown in solid lines at an extended length and in phantom at a collapsed length.

FIGURE 3 is a top view of the vehicle shown in FIGURE 2 showing the vehicle at its extended length.

FIGURE 4 is an enlarged, top view of the central portion of the vehicle.

FIGURE 5 is a side view of the structure shown in FIGURE 4.

FIGURE 6 is a section on the line 6—6 of FIGURE 5.

FIGURE 7 is a diagrammatic, top view showing the control and steering cable structure.

FIGURE 8 is a view similar to FIGURE 7 showing the vehicle in contracted form.

FIGURE 9 is a side view of the structure shown in FIGURE 7.

FIGURE 10 is a side view of the structure shown in FIGURE 8.

Figure 11:
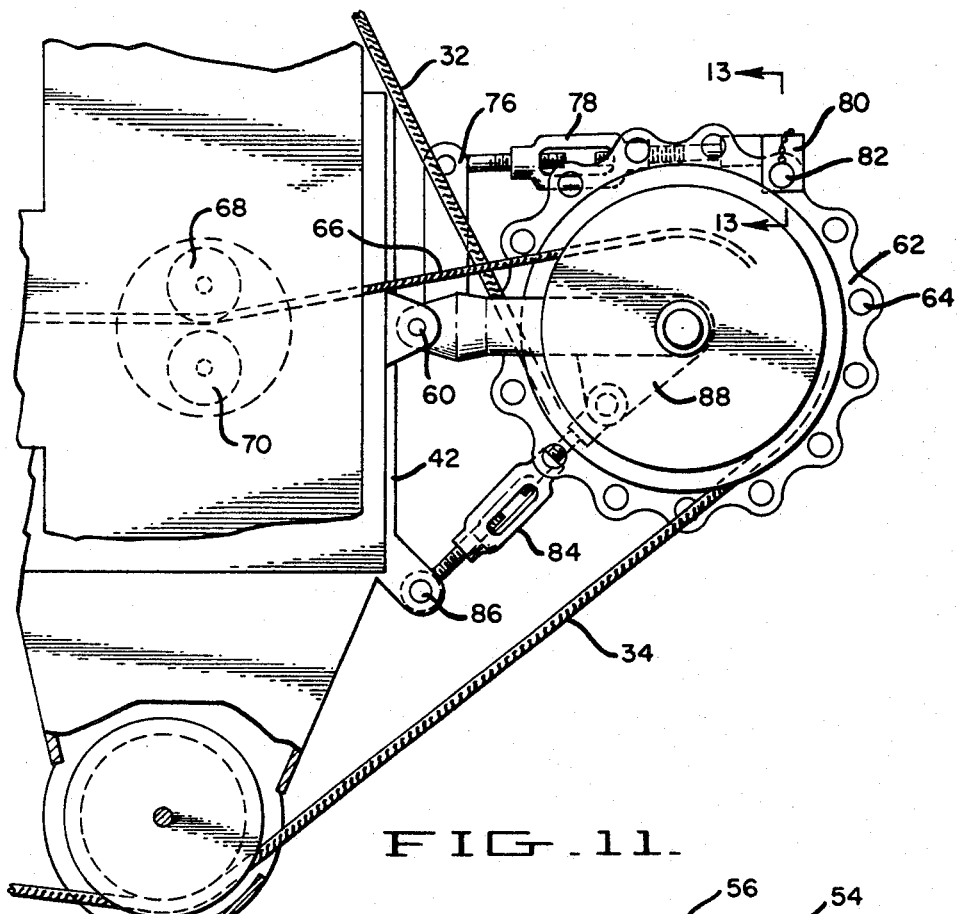
FIGURE 11 is an enlarged, plan view of the cable take-up structure.
Figure 12:
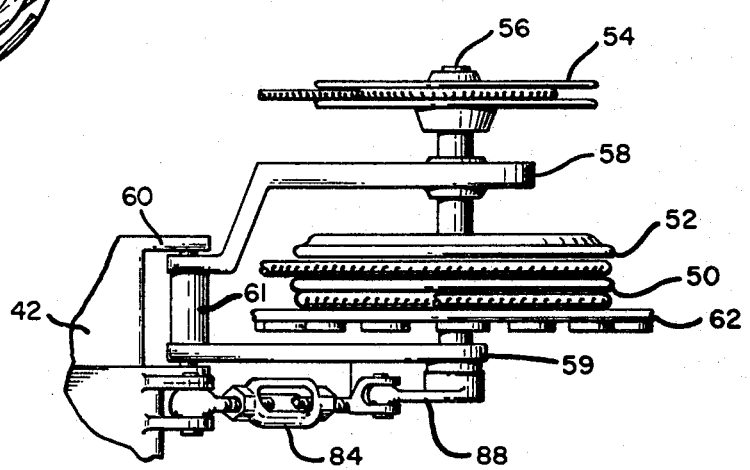
FIGURE 12 is a side view of the structure shown in FIGURE 11.
Figure 13:
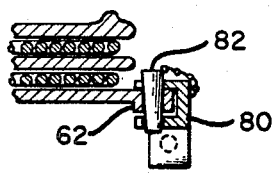
FIGURE 13 is a section on the line 13—13 of FIGURE 11.

Referring now to the drawings by reference characters, there is shown a vehicle having a tractor element, generally designated 16, and a bogie or dolly element 18. The two elements are connected together by a telescoping reach, generally designated 20. Reach 20 is connected to the tractor and dolly through pivoted load carrying elements, hereinafter described, and reach 20 includes an inner reach element 22 and an outer reach element 24. The inner reach element 22 is shown connected to the tractor while the outer reach element 24 is connected to the dolly unit, although it is obvious that this could be reversed. Mounted on the frame of the tractor element is a first steering bar 26 having spaced apart connection means 28 and 30 for the attachment of the steering cables 32 and 34. A front load carrying element 36 is pivoted over the steering bar 26 and the front reach element 22 is fastened directly to the front load carrying element.

The dolly 18 is preferably of the type having two axles 38 and 40, although a single axle dolly might be employed. The dolly 18 includes a main frame 42 having pulleys 44 and 46 located in a fixed, spaced apart relationship forming a second steering bar over which pulleys the crossed steering cables 32 and 34 pass. Rear load carrying element 37 is pivoted over the second steering bar and reach element 24 is connected directly to this rear load carrying element.

It will be recognized that the relative distance between the front connectors 28 and 30 and the outer portions of the pulleys 44 and 46 will determine the steering characteristics of the vehicle. In the embodiment shown, the distance between the front connecting points 28 and 30 is slightly less than the distance between the extremities of pulleys 44 and 46 so that the rear wheels do not turn as much as the front wheels, making the rear wheels track slightly inside of the track of the front wheels. However, this relationship could be altered to secure any desired steering characteristics of the rear wheels.

The automatic steering cable take-up device has been generally designated 48 and will now be described in detail. The take-up device includes a lower reel 50 on which steering cable 34 is wound, an upper reel 52 on which steering cable 32 is wound and a control reel 54 on which a control cable 66 is wound, all affixed to a shaft 56. The steering cables are wound in one direction while the control cable is wound in the opposite direction. Shaft 56 is mounted for rotation on an upper support member 58 and a lower support member 59 which are rigidly attached to rod 61 and pivoted by means of a pivot 60 on frame 42. Also fixed to the shaft 58 is a locking wheel 62 having a series of holes 64 therein for locking the shaft 58 and the associated reels in a desired position. Control cable 66 passes between a pair of closely spaced pulleys 68 and 70, the center point between the pulleys being approximately the same as the mounting point for pivoting the rear load support element 37, so that regardless how the bogie 18 is turned with respect to the reach 20, that portion of the cable 66 within the reach will be substantially parallel with the reach.

A mounting lug 72 is provided on the forward or inner reach and to this is attached a spring 74. Cable 66 is attached to this spring 74 and then passes over a first pulley 76 mounted on the forward or inner reach element and then reverses direction and passes over a second pulley 78 mounted on the outer or rear reach element. The cable then passes between the pulleys 68 and 70, previously described, and onto the reel 56, the end of the cable being fastened on the hub of the reel in known manner. As was pointed out above, cables 32 and 34 are wrapped around the reels 52 and 50, respectively, in the same direction while cable 66 is wrapped around reel 56 in the opposite direction. Thus, when the vehicle is extended, cables 32 and 34 will be unwound from reels 52 and 50 while cable will be wound up on reel 54 and vice versa when the vehicle is contracted. The arrangement shown does not maintain a one-to-one ratio under all conditions, since when there are only a few turns of cable upon a reel, a single revolution of the reel takes up considerably less cable than does a single revolution when the reel is substantially filled. Therefore, spring 74 serves to take up any slack which would otherwise result from the effective variation of the diameters of the reels depending upon how much cable has been wound thereon.

With the structure thus far described, it is apparent that it is only necessary to lock the brakes on the dolly unit and then drive the tractor unit forward or back to make an adjustment in the length of the load carrying portion of the vehicle. This relationship can best be seen from FIGURES 7 through 10. Thus, assuming the vehicle as shown in the telescoped form in FIGURE 8 with the brakes set on the dolly and that the tractor 16 is driven forward to the position shown in FIGURE 7, it is apparent that the cables 32 and 34 will then unwind from the reels 50 and 52, rotating shaft 58 in a clockwise direction. This in turn will cause cable 66 to be taken up on reel 56 so that cables 32, 34 and 68 will be taut at all times. Naturally, the reverse will happen when the unit is again telescoped.

After the unit has been extended or telescoped to the desired length, the cables can be locked by the structure now to be described. To provide an effective lock on the shaft 58 and the associated reels, an arm 76 is provided which is rigidly fastened to the lower support member 59. A turnbuckle 78 connected thereto terminates in a U-shaped member 80 having holes therein corresponding in size with the openings 64 in wheels 62. To lock the structure, a pin 82 is used to fasten wheel 62 by dropping it through the holes of the U-shaped member 80 and one of the holes 64 in the wheel 62. The gradations between holes in the wheel 62 are somewhat large and turnbuckle 78 is employed to move the U-shaped member 80 back and forth through a short distance in case the holes are not in exact alignment when the desired length is reached. Thus, a stepless control of the length is provided and it is not necessary to change the length of the unit in any predetermined increments.

A means is also provided for compensating for any slight difference in length between cables 32 and 34 which might be caused by stretching or the like. This comprises a turnbuckle 84 which is attached at point 86 to frame 42 with the opposite end attached to a plate 88 on shaft 58. This allows one to swing the shaft supports 58 and 59 in one direction or the other to change the relative tension on the two cables. Thus, if cable 32 were slack, the turnbuckle would be taken up tending to tighten cable 32 and loosen cable 34 while loosening the turnbuckle 84 would produce the reverse situation.

Means are provided within the reach element for the automatic taking up and paying out of brake and light lines, as shown in FIGURES 9 and 10, but this is not described since it forms no part of the present invention and is fully described in Patent No. 3,156,487.

Figure 14:
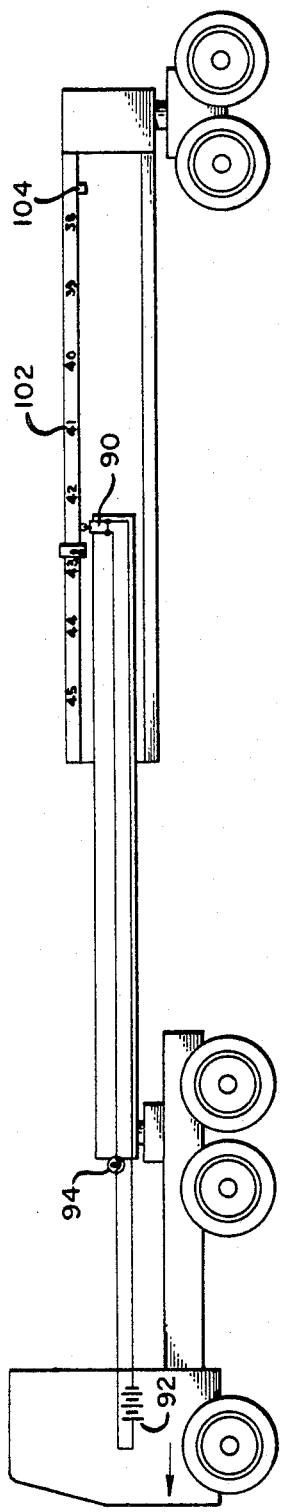
FIGURE 14 is a diagrammatic, side view of a vehicle having an automatic indicator light thereon.
Figure 15:
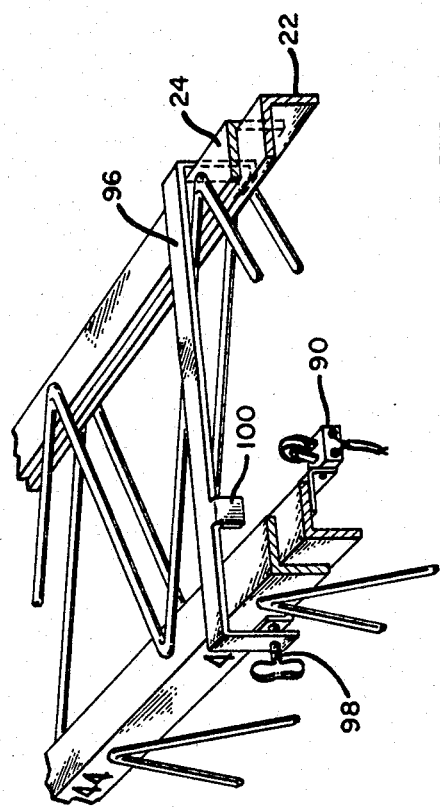
FIGURE 15 is a partial, perspective view of the switch and actuating structure shown in FIGURE 14.

Another feature of the invention is shown in FIGURES 14 and 15. Heretofore, it has been necessary in changing length to have the tractor driven forward while a helper notes the change in length and signals the operator of the tractor to stop at the desired point. In accordance with the present invention, an improved device is provided whereby a single person can easily extend or telescope the vehicle to a desired length. For accomplishing this, a switch 90 is employed on the inner reach element, the switch being in series connection with the battery 92 of the vehicle and an indicator light 94. An arm 96 is provided which extends over the outer reach element 24 having a clamp 98 thereon and also having a tab 100 adapted to contact the switch 90. If desired, length markers such as at 102 can be provided on one of the reach elements. In order to use this device, it is only necessary for the operator to move the arm 96 to a position corresponding with the desired length of the vehicle and to then drive the tractor forward or back until the indicator light 94 lights. In this manner, a single operator can easily set the vehicle to a desired length. In addition, one or more tabs 104 can be fixed to the outer reach to serve as warning lights that the reach is fully extended, fully telescoped or the like.

In operation, assuming that the vehicle is fully telescoped, it is only necessary that the pin 82 be withdrawn, the brakes of the trailer set and the tractor driven to a point wherein the reach has the desired extension, utilizing, if desired, switch 90 and the associated equipment to indicated when the desired length has been reached. After the desired length has been reached, it is then only necessary to drop the pin 82 through the U-shaped member 80 into one of the holes 64 on wheel 62. If the holes are not in exact alignment, alignment can be achieved by the use of the turnbuckle 78. Further, should it develop that one or the other of the cables 32 or 34 is slack, the cable tensions can be equalized utilizing turnbuckle 84. It will be noted that this clamping action utilizing the pin 82 also serves to clamp the reach elements with respect to each other. The action of the cable 66 opposing the motion of the cables 32 and 34 serves to hold the reach in any given degree of extension which effect is augmented by a load borne by the load carriers.

There are many variations which can be made in the exact structure described. For instance, the cables have been shown as being wound in a certain direction but this direction could be reversed, it only being necessary that the steering cables be wound in one direction and that the control cables be wound in the opposite direction.

The control unit has been shown as being mounted upon the dolly but it is obvious that the action would be exactly the same if the control unit were mounted on the tractor.

Reel-type take-ups have been provided for the cables wherein each turn directly overlies the previous turn, and instead of this type of take-up, one could employ drums wherein adjacent turns are wound in side-by-side relationship. With drums, the one-to-one relationship necessary between the control cables and the steering cables would be maintained so that it would not be necessary to employ the spring 74 and the pulley 76, but the control cable could be fastened directly near the outer end of reach element 22.

Many forms of locking mechanisms can be employed instead of the exact one shown, it only being necessary that some capability be provided for simultaneously locking the reels which hold the control cable and steering cables. Other means could be used for adjusting the relative tension of the two steering cables, such as the employment of turnbuckles in the cables.

Shaft 56 has been shown as being rotatably mounted but instead, the three take-up reels and the locking mechanism could be mounted to rotate together upon a fixed shaft.

Many other variations can be made of the exact structure shown without departing from the spirit of this invention.

We claim:
1. In combination with a tractor-dolly vehicle wherein first and second vehicle elements have first and second frames with first and second steering bars fixed to the respective frames with first and second load carriers pivotally mounted with respect to said steering bars and with a telescoping reach extending between the load carriers, said telescoping reach including a first reach element connected to the first load carrier and a second reach element connected to the second load carrier and with a pair of crossed steering cables connecting the ends of the first and second steering bars, the improvement comprising:

(a) one end of each of said steering cables connected to the ends of the first steering bar,
(b) pulleys at each end of the second steering bar with each of said steering cables passing over one of said pulleys,
(c) a shaft mounted on the second frame,
(d) said shaft having three reels thereon, said reels being joined for rotation together,
(e) said steering cables being fastened to two of said reels whereby rotation in one direction causes both of said cables to be wound up on their respective reels,
(f) a control cable, said control cable being fastened to the third reel and being wound in the opposite direction from the steering cables,
(g) a direction reversing pulley near the end of the second reach element.
(h) said control cable passing along the second reach element, over said direction reversing pulley and being fastened to the first reach element and
(i) means for locking said reels with respect to the frame.

2. The structure of claim 1 wherein the second vehicle element is the dolly.

3. The structure of claim 1 wherein the first reach element includes a direction reversing pulley near its outer end and wherein said control cable passes over said pulley and is fastened to the first reach element through a spring.

4. The structure of claim 1 wherein the locking means comprises a wheel with a series of holes therein, said wheel being mounted for rotation with said reels, and a locking element with a mating hole fixed with respect to the vehicle frame, whereby a pin can be placed in one of the holes of the wheel and in the hole of the locking element, thereby locking the three reels.

5. The structure of claim 4 wherein said locking element is provided with adjusting means to change its position with respect to the frame.

6. The structure of claim 1 wherein the shaft is mounted on a sub-frame, said sub-frame being pivoted on the vehicle element frame whereby changing the position of the sub-frame varies the tension on the respective steering cables.

References Cited

UNITED STATES PATENTS

| | | | |
|---|---|---|---|
| 2,271,808 | 2/1942 | Starkey | 280—404 |
| 2,764,424 | 9/1956 | Standing | 280—426 |
| 3,156,487 | 11/1964 | Bigge | 280—404 |
| 3,165,336 | 1/1965 | Bigge | 280—421 |
| 3,195,922 | 7/1965 | Humes | 280—426 |

BENJAMIN HERSH, *Primary Examiner.*

J. SIEGEL, *Assistant Examiner.*